(12) United States Patent
Yu

(10) Patent No.: US 9,525,633 B2
(45) Date of Patent: Dec. 20, 2016

(54) METHOD AND APPARATUS FOR ADJUSTING IP NETWORK LOAD

(71) Applicant: HUAWEI TECHNOLOGIES CO., LTD., Shenzhen (CN)

(72) Inventor: Haoze Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 171 days.

(21) Appl. No.: 14/083,788

(22) Filed: Nov. 19, 2013

(65) Prior Publication Data

US 2014/0078904 A1  Mar. 20, 2014

Related U.S. Application Data

(63) Continuation of application No. PCT/CN2012/070237, filed on Jan. 11, 2012.

(51) Int. Cl.
*H04L 12/933* (2013.01)
*H04L 12/803* (2013.01)
(Continued)

(52) U.S. Cl.
CPC ......... *H04L 47/125* (2013.01); *H04L 49/1515* (2013.01); *H04L 49/1569* (2013.01);
(Continued)

(58) Field of Classification Search
CPC ...... H04L 45/60; H04L 49/1569; H04L 45/02; H04L 47/125
See application file for complete search history.

(56) References Cited

U.S. PATENT DOCUMENTS

| | | | |
|---|---|---|---|
| 5,754,120 A * | 5/1998 | Argentati | ............... H04L 49/25 |
| | | | 340/2.22 |
| 6,801,502 B1 | 10/2004 | Rexford et al. | ............. 370/235 |

(Continued)

FOREIGN PATENT DOCUMENTS

| | | |
|---|---|---|
| CN | 1458798 | 11/2003 |
| CN | 1767501 | 5/2006 |

(Continued)

OTHER PUBLICATIONS

European Office Action issued on Nov. 17, 2014 in corresponding European Patent Application No. 12 732 032.3.

(Continued)

*Primary Examiner* — Raj Jain
(74) *Attorney, Agent, or Firm* — Staas & Halsey LLP

(57) ABSTRACT

A method for adjusting an IP network load, includes: receiving an IP packet flow; and adjusting a forwarding path of an IP packet according to a load status of an IP network, and sending the IP packet, where network devices of the IP network are interconnected to form a multi-stage CLOS topology structure. According to the method, the forwarding path of the network load may be adaptively adjusted according to the dynamic load status of the network, so as to achieve dynamic load balancing of the entire network; through the dynamic load balancing, possible congestion in the network is better eliminated, thereby improving quality of service; unavoidable design for a light load caused by an actuality of an unbalanced network load is avoided, thereby enabling the network to be designed for a heavy load and increasing a utilization rate of network capacity.

15 Claims, 2 Drawing Sheets

(51) Int. Cl.
H04L 12/931 (2013.01)
H04L 12/751 (2013.01)
H04L 12/773 (2013.01)

(52) U.S. Cl.
CPC ............ *H04L 49/50* (2013.01); *H04L 49/602* (2013.01); *H04L 45/02* (2013.01); *H04L 45/60* (2013.01)

(56) References Cited

U.S. PATENT DOCUMENTS

| | | | |
|---|---|---|---|
| 7,596,135 | B1 | 9/2009 | Iovine et al. .................. 370/388 |
| 7,889,734 | B1* | 2/2011 | Hendel .................. H04L 12/56 370/392 |
| 8,259,713 | B2* | 9/2012 | Lawrence ............... H04L 45/04 370/387 |
| 2003/0103461 | A1* | 6/2003 | Jorgenson ............. H04L 41/142 370/241 |
| 2006/0248191 | A1* | 11/2006 | Hudson .................... H04L 29/12 709/226 |
| 2007/0086429 | A1 | 4/2007 | Lawrence et al. ............. 370/351 |
| 2008/0151863 | A1* | 6/2008 | Lawrence ............... H04L 49/15 370/351 |
| 2010/0097928 | A1* | 4/2010 | Ramakrishnan ........ H04L 41/12 370/221 |
| 2014/0078904 | A1* | 3/2014 | Yu ....................... H04L 49/1515 370/235 |

FOREIGN PATENT DOCUMENTS

| | | |
|---|---|---|
| CN | 101119503 | 2/2008 |
| CN | 102238072 | 11/2011 |
| EP | 0 781 021 A2 | 6/1997 |
| EP | 1 986 375 A1 | 10/2008 |

OTHER PUBLICATIONS

Abts, Dennis, William J. Dally, and John Kim. "Adaptive Routing in High-Radix Clos Network." Paper in proceedings of *2006 IEEE: 2006 ACM/IEEE SC|06 Conference (SC'06)*, Tampa, Florida, Nov. 2006. pp. 1-11.

Kleban, Janusz. "Packet Dispatching Schemes for Three-Stage Buffered Clos-Network Switches," in *Switched Systems*. Edited by Janusz Kleban, InTech, Rijeka, Croatia, pp. 135-161, Dec. 2009.

Dasgupta, S., D. Edwards, Z. Liu, and W. Song. "Routing of asynchronous Clos networks." Selected paper in $10^{th}$ *International Conference on Application of Concurrency to System Design (ACSD 2010)*, Braga, Portugal, Jun. 21-25, 2010. Also published in *IET Computers & Digital Techniques* 5(6), pp. 452-467, (2011). Doi: 10.1049/iet.cdt.2010.0150.

Extended European Search Report issued Jan. 30, 2014, in corresponding European Patent Application No. 12732032.3.

International Search Report mailed Oct. 4, 2012 in corresponding International Patent Application No. PCT/CN2012/070237.

Chinese Office Action issued on Jun. 5, 2014 in corresponding Chinese Patent Application No. 201280000064.0.

Proceedings: Sc 06: Powerful Beyond Imagination: Proceedings: Nov. 11-17, 2006, Tampa Convention Center, Tampa Florida. [United States: Association for Computing Machinery], 2006.

Mumtaz Siddiqui et al. "Grid Capacity Planning with Negotiation-based Advance Reservation for Optimized QoS," sc, pp. 21, Proceedings of the 2006 ACM/IEEE conference on Supercomputing, 2006.

\* cited by examiner

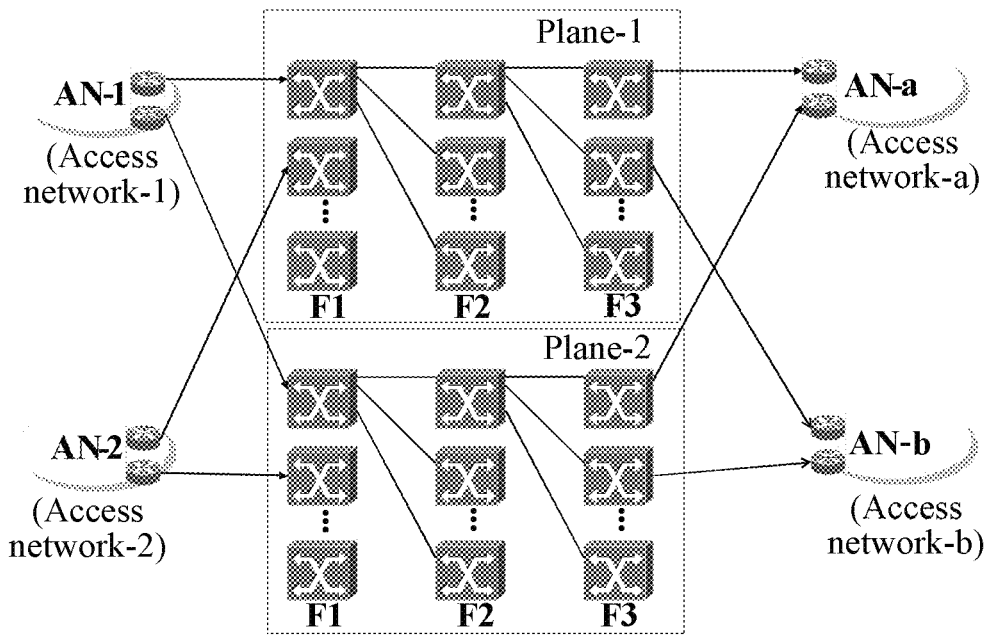

FIG. 3

| Configure a cost of each interconnection link and a QOS parameter of each interconnection link inside a CLOS network, define an IP packet flow, and initialize a link load | 41 |

| An ingress router at an F1 stage receives an IP packet flow f from an AN | 42 |

| The ingress router at the F1 stage obtains a forwarding path p of the IP packet flow f through a CLOS dispatch algorithm disp, and records the forwarding path p | 43 |

| The ingress router at the F1 stage sends the IP packet flow f through the forwarding path p to a destination AN, and modifies a load value of each interconnection link inside the CLOS network | 44 |

FIG. 4

METHOD AND APPARATUS FOR ADJUSTING IP NETWORK LOAD

CROSS-REFERENCE TO RELATED APPLICATIONS

This application is a continuation of International Application No. PCT/CN2012/070237, filed on Jan. 11, 2012, which is hereby incorporated by reference in its entirety.

TECHNICAL FIELD

Embodiments of the present disclosure relate to the field of communications technologies, and in particular, to a method and an apparatus for adjusting an IP network load.

BACKGROUND

With the rapid development of IP (Internet Protocol) applications, traffic of an IP network, especially a backbone network, grows rapidly. At present, the IP network is generally formed by a router and an optical transmission device. At a packet level, forwarding paths of IP packets are all based on IP routing paths, therefore, a forwarding path of an IP packet is fixed as long as IP routing is unchanged. However, an IP network load is changing. If the forwarding path of the IP packet cannot be adjusted dynamically according to the load, an overall load of the network is unbalanced, so that the network is partially congested, a utilization rate of network capacity is low, and quality of service of the network is affected.

SUMMARY

An objective of embodiments of the present disclosure is to provide a method and an apparatus for adjusting an IP network load, so as to implement network load balancing.

In one aspect, an embodiment of the present disclosure provides a method for adjusting an IP network load, including:

receiving an IP packet flow; and adjusting a forwarding path of an IP packet according to a load status of an IP network, and sending the IP packet, where network devices of the IP network are interconnected to form a multi-stage CLOS topology structure.

In another aspect, an embodiment of the present disclosure provides an apparatus for adjusting an IP network load, including:

a receiving unit, configured to receive an IP packet flow; and an adjusting unit, configured to adjust a forwarding path of an IP packet according to a load status of an IP network, and send the IP packet, where network devices of the IP network are interconnected to form a multi-stage CLOS topology structure.

According to the method and apparatus for adjusting the IP network load according to the embodiments of the present disclosure, the forwarding path of the network load may be adaptively adjusted according to a dynamic load status of the network, so as to achieve dynamic load balancing of the entire network; through the dynamic load balancing, possible congestion in the network is better eliminated, thereby improving quality of service; unavoidable design for a light load caused by an actuality of an unbalanced network load is avoided, thereby enabling the network to be designed for a heavy load and increasing a utilization rate of network capacity.

BRIEF DESCRIPTION OF DRAWINGS

FIG. 3 is a schematic diagram of an application scenario of a method for adjusting an IP network load according to an embodiment of the present disclosure; and FIG. 4 is a schematic application flow chart of a method for adjusting an IP network load according to an embodiment of the present disclosure.

DESCRIPTION OF EMBODIMENTS

Figure 1:
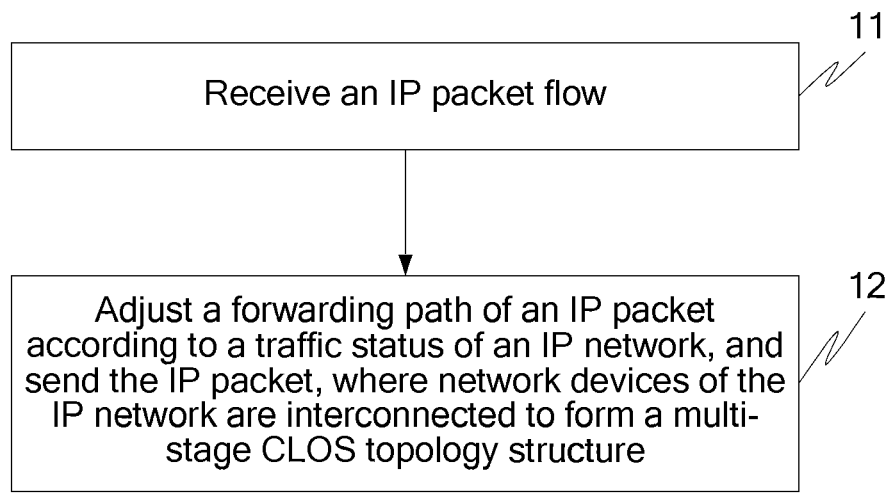
FIG. 1 is a schematic flow chart of a method for adjusting an IP network load according to an embodiment of the present disclosure.

As shown in FIG. 1, an embodiment of the present disclosure provides a method for adjusting an IP network load, including:

11: Receive an IP packet flow.

12: Adjust a forwarding path of an IP packet according to a load status of an IP network, and send the IP packet, where network devices of the IP network are interconnected to form a multi-stage CLOS topology structure.

An execution subject of the method for adjusting the IP network load according to the embodiment of the present disclosure may be, but is not limited to, an ingress network device of the multi-stage CLOS topology structure formed by interconnecting the network devices of the IP network. Another network device of the multi-stage CLOS topology structure may also be applicable, where the network device may be a router or a switch.

Persons skilled in the art should know that the CLOS is a multi-stage multi-plane network switching technology (first proposed by Dr. Charles Clos and named after him). In the CLOS switching technology, a dynamic dispatch algorithm is adopted, and a forwarding path of a data packet is selected dynamically according to an overall load status of a switching network, so as to implement dynamic load balancing.

It may be seen that, according to the method for adjusting the IP network load in the embodiment of the present disclosure, the forwarding path of the network load may be adaptively adjusted according to the dynamic load status of the network, so as to achieve the dynamic load balancing of the entire network; through the dynamic load balancing, possible congestion in the network is better eliminated, thereby improving quality of service; moreover, the network may be designed for a heavy load, a utilization rate of network capacity is increased, and a greater load may be carried with a same device and network capacity, thereby lowering the cost.

Optionally, a manner of adjusting the forwarding path of the IP packet according to the load status of the IP network may include:

A CLOS-based dispatch function disp is used to calculate the forwarding path, p=disp (f, l, c, s, p0), where p indicates a forwarding path that needs to be calculated for forwarding an IP packet flow f;

f indicates the IP packet flow;

l indicates a load of each interconnection link inside the CLOS;

c indicates a cost of each interconnection link inside the CLOS;

s indicates a QOS (Quality of Service) parameter of each interconnection link inside the CLOS; and p0 indicates a current forwarding path of the IP packet flow f.

Specifically speaking, the IP packet flow may be defined by a 5-tuple. The 5-tuple includes a source IP address, a destination IP address, a source MAC (Media Access Control) address, a destination MAC address, and a port number.

The cost of each interconnection link: The link cost may be understood with reference to a link cost defined in an IP routing protocol, for example, a link cost in an OSPF (Open Shortest Path First) routing protocol. Exemplarily, the link cost is embodied in, but not limited to, a link distance. Generally, the longer the link distance is, the higher the link cost is.

The QOS parameter of each interconnection link: The QOS parameter of the link may include a delay, a jitter, a bandwidth, a packet loss rate, and the like. Specifically, the delay refers to a delay of a data packet when passing through the link, the bandwidth refers to a bandwidth of the link, and the jitter refers to a variation of the delay.

Optionally, the IP network may include a Layer 3 IP network, for example, a Layer 3 IP network such as a native IP network and so on. Alternatively, the IP network may include a Layer 2 IP network, for example, a Layer 2 network such as an MPLS (Multi-Protocol Label Switching) network or an Ethernet and so on.

When the IP network is an MPLS network, the adjusting the IP network load provided in the embodiment of the present disclosure may further include:

Configuring an LSP (Label Switched Path) path corresponding to each interconnection link of the IP network.

Figure 2:
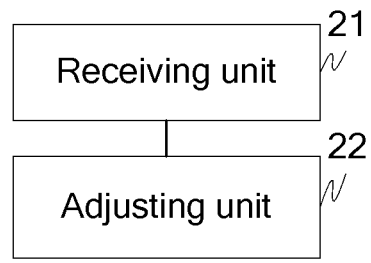
FIG. 2 is a schematic constitutional diagram of an apparatus for adjusting an IP network load according to an embodiment of the present disclosure.

As shown in FIG. 2, corresponding to the method for adjusting the IP network load according to the foregoing embodiment, an embodiment of the present disclosure provides an apparatus for adjusting an IP network load, including:

a receiving unit 21, configured to receive an IP packet flow.

an adjusting unit 22, configured to adjust a forwarding path of an IP packet according to a load status of an IP network, and send the IP packet, where network devices of the IP network are interconnected to form a multi-stage CLOS topology structure.

Persons skilled in the art may know that the CLOS is a multi-stage multi-plane network switching technology. In the CLOS switching technology, a dynamic dispatch algorithm is adopted, and a forwarding path of a data packet is selected dynamically according to an overall load status of a switching network, so as to implement dynamic load balancing.

It may be seen that, according to the apparatus for adjusting the IP network load in the embodiment of the present disclosure, the forwarding path of the network load may be adaptively adjusted according to the dynamic load status of the network, so as to achieve the dynamic load balancing of the entire network; through the dynamic load balancing, possible congestion in the network is better eliminated, thereby improving quality of service; moreover, the network may be designed for a heavy load, a utilization rate of network capacity is increased, and a greater load may be carried with a same device and network capacity, thereby lowering the cost.

Optionally, the adjusting unit 22 may be specifically configured to use a CLOS-based dispatch function disp to calculate a forwarding path, $p=disp(f, l, c, s, p0)$, where p indicates a forwarding path that needs to be calculated for forwarding an IP packet flow f;

f indicates the IP packet flow;

l indicates a load of each interconnection link inside the CLOS;

c indicates a cost of each interconnection link inside the CLOS;

s indicates a QOS parameter of each interconnection link inside the CLOS; and p0 indicates a current forwarding path of the IP packet flow f.

Specifically, the IP packet flow may be defined by a 5-tuple. The 5-tuple includes a source IP address, a destination IP address, a source MAC address, a destination MAC address, and a port number.

The cost of each interconnection link: The link cost may be understood with reference to a link cost defined in an IP routing protocol, for example, a link cost in an OSPF routing protocol. Exemplarily, the link cost is, for example, but not limited to, a link distance.

The QOS parameter of each interconnection link: The QOS parameter of the link may include a delay, a jitter, a bandwidth, a packet loss rate, and the like. Specifically, the delay refers to a delay of a data packet when passing through the link, the bandwidth refers to a bandwidth of the link, and the jitter refers to a variation of the delay.

Optionally, the IP network may include a Layer 3 IP network, for example, a Layer 3 IP network such as a native IP network and so on. Alternatively, the IP network may include a Layer 2 IP network, for example, a Layer 2 network such as an MPLS network or an Ethernet and so on.

Optionally, when the IP network is an MPLS network, the apparatus for adjusting the IP network load according to the embodiment of the present disclosure may further include:

a setting unit, configured to configure an LSP path corresponding to each interconnection link of the IP network.

Embodiment 1 of the Present Disclosure

A method for adjusting an IP network load according to this embodiment of the present disclosure is described in the following with a Native IP network.

As shown in FIG. 3, the IP network is formed by multiple planes (FIG. 3 only shows two planes), and an AN (Access Network) is dual-homed and connected to each plane. Inside each plane, routers of the IP network are interconnected by adopting CLOS (referred to as a CLOS network). FIG. 3 is a schematic diagram of three-stage CLOS interconnection, where a CLOS topology structure supports multiple stages, and the specific number of stages is determined according to capacity needed by the network.

As shown in FIG. 4, the method for adjusting the IP network load according to the embodiment of the present disclosure includes:

41: Configure a cost of each interconnection link and a QOS parameter of each interconnection link inside the CLOS network, define an IP packet flow, and initialize a link load. For example, the link load is initialized to 0. For example, the IP packet flow f is defined by a 5-tuple of a source IP address, a destination IP address, a source media access control MAC address, a destination MAC address, and a port number.

42: An ingress router at an F1 stage receives the IP packet flow f from an AN (for example, AN-1 or AN-2). For example, the IP packet flow f is defined by a 5-tuple of a source IP address, a destination IP address, a source media access control MAC address, a destination MAC address, and a port number.

43: The ingress router at the F1 stage obtains a forwarding path p of the IP packet flow f through a CLOS dispatch algorithm disp, and records the forwarding path p. The forwarding path p refers to a path from a source AN to a destination AN, for a designated IP packet flow. The forwarding path passes from F1 to F3 through F2.

44: The ingress router at the F1 stage sends the IP packet flow f through the forwarding path p to the destination AN (for example, AN-a or AN-b), and modifies a load value of each interconnection link inside the CLOS network, so as to reflect a dynamic status of the network load.

The obtaining the forwarding path p of the IP packet flow f through the CLOS dispatch algorithm disp in 43 may include:

The CLOS dispatch algorithm disp is a function whose output is a forwarding path p of an IP packet flow. The CLOS dispatch algorithm disp may be defined as follows by using a function:

p=disp (f, l, c, s, p0)

where p is a forwarding path of an IP packet flow f to be forwarded;

f is the IP packet flow to be forwarded, which is defined by a 5-tuple;

l is a load inside the CLOS network, dynamically recording a load of each interconnection link inside the CLOS network;

c is a cost of each interconnection link inside the CLOS network, for example, a link distance (for a long-distance link, the link cost differs greatly, therefore, the link cost must be taken into consideration in a path decision);

s is a QOS characteristic of each interconnection link inside the CLOS network, for example, a delay (for a long-distance link, the delay differs greatly, therefore, the QOS characteristic of the link must be taken into consideration in the path decision); and p0 refers to a current forwarding path of the IP packet flow f, where the forwarding path of the IP packet flow f may change with a variation of the network load.

Optionally, in the method for adjusting the IP network load according to the embodiment of the present disclosure:

If a situation of load unbalancing occurs in the CLOS network, the forwarding path of the IP flow needs to be adjusted. Such adjustment is performed by taking a flow as a unit, so as to avoid disorder of IP packets. As a result of the adjustment, forwarding paths of some IP flows are changed, thereby regaining load balancing of the CLOS network. After the adjustment, a forwarding path corresponding to each IP flow is recorded, so that a subsequent IP packet of each IP flow is always forwarded through the given forwarding path, so as to ensure sequence of the IP packets.

Persons skilled in the art should know that, according to the CLOS dispatch algorithm disp, whether a load is balanced may be judged according to a certain criterion. For example, if a utilization rate of a certain link is 10% greater than an average link utilization rate, the link is overloaded, and the load unbalancing occurs in the CLOS network. The judgment of whether the responsibility is balanced through the CLOS dispatch algorithm disp may be understood with reference to relevant technologies in the prior art, which is not repeatedly described here.

If congestion occurs in the CLOS network, that is, traffic of the network exceeds designed capacity of the network, a packet loss may occur. The packet loss is processed according to a traffic management method, for example, a data packet with a low priority is preferentially discarded to ensure normal transmission of a data packet with a high priority. How to judge whether the congestion occurs and which manner of packet discard is used may be understood according to the prior art, which are not repeatedly described here.

Embodiment 2 of the Present Disclosure

A method for adjusting an IP network load according to this embodiment of the present disclosure is described with an MPLS network.

A difference between Embodiment 2 and Embodiment 1 of the present disclosure lies in different network layer technologies. Embodiment 2 is working on the MPLS network, and has the following differences as compared with Embodiment 1.

A CLOS network (three stages of F1, F2, and F3) is an MPLS network. The three stages of F1, F2, and F3 are interconnected by adopting an LSP of the MPLS to form a CLOS interconnection topology structure.

Routers at the F1 stage and routers at the F3 stage are PEs (Provider Edge) of the MPLS. The router at the F1 stage maps an IP packet flow from an AN to the LSP. The router at the F3 stage recovers the IP packet flow in the LSP and sends the IP packet flow to a destination AN. A router at the F2 stage performs MPLS switching.

It may be seen that, an ingress router encapsulates an IP data packet in the MPLS, and executes a CLOS dispatch algorithm disp, where the dispatch algorithm is the same as that in Embodiment 1. An intermediate router performs MPLS switching.

Embodiment 3 of the Present Disclosure

A method for adjusting an IP network load according to this embodiment of the present disclosure is described with an Ethernet network.

A difference between Embodiment 3 and Embodiment 1 of the present disclosure lies in different network layer technologies. Embodiment 3 is based on another Layer 2 network such as an Ethernet, an ATM (Asynchronous Transfer Mode), and an FR (Frame Relay, frame relay technology), and has the following differences as compared with Embodiment 1.

A Layer 2 packet flow from an AN is related to a specifically used network protocol. For example, an Ethernet packet flow may be defined by a VLAN (Virtual Local Area Network), and may also be defined by a source MAC address and a destination MAC address, which depends on different application scenarios.

A CLOS network (three stages of F1, F2, and F3) is a Layer 2 network (for example, an Ethernet). The three stages of F1, F2, and F3 are interconnected by adopting a Layer 2 link (for example, the Ethernet) to form a CLOS interconnection topology structure.

Routers at the F1, F2, and F3 stages perform Layer 2 forwarding. A forwarding path is calculated through a CLOS dispatch algorithm disp. In this case, f in the disp algorithm is the foregoing described Layer 2 packet flow.

Persons of ordinary skill in the art may understand that all of or part of the processes of the methods in the embodiments may be implemented by a computer program instructing relevant hardware. The program may be stored in a computer readable storage medium. When the program is executed, the processes of the method in the embodiments are included. The storage medium may be a magnetic disk, a compact disk, a read-only memory (ROM), or a random access memory (RAM) and so on.

What is claimed is:

1. A method for adjusting an IP network load, comprising:
receiving, by a network device of a multi-stage CLOS topology structure, an IP packet flow; and
adjusting, by the network device of the multi-stage CLOS topology structure, a forwarding path of an IP packet according to a quality of service (QOS) parameter of each interconnection link inside the multi-stage CLOS topology structure, and sending, by the network device of the multi-stage CLOS topology structure, the IP packet, where the network device of the multi-stage CLOS topology structure is in the IP network; wherein network devices of the IP network are interconnected to form a multi-stage CLOS topology structure;
wherein the adjusting the forwarding path of the IP packet according to the load status of the IP network comprises:
using a CLOS-based dispatch function disp to calculate a forwarding path, p=disp (f, l, c, s, p0), wherein
p indicates a forwarding path that needs to be calculated for forwarding an IP packet flow f;
f indicates the IP packet flow;
l indicates a load of each interconnection link inside the CLOS;
c indicates a cost of each interconnection link inside the CLOS;
s indicates a quality of service (QOS) parameter of each interconnection link inside the CLOS; and
p0 indicates a current forwarding path of the IP packet flow f.

2. The method according to claim 1, wherein the IP packet flow is defined by a 5-tuple and the 5-tuple comprises: a source IP address, a destination IP address, a source media access control (MAC) address, a destination MAC address, and a port number.

3. The method according to claim 1, wherein
the cost of each interconnection link comprises a link distance; and
the QOS parameter of each interconnection link comprises one or more of: a delay, a jitter, a bandwidth and a packet loss rate.

4. The method according to claim 3, wherein when the IP network is a multi-protocol label switching (MPLS) network, the method further comprises:
configuring a label switched path (LSP) path corresponding to each interconnection link of the IP network.

5. The method according to claim 1, wherein the IP network comprises one of: a native IP network, a multi-protocol label switching (MPLS) network, and an Ethernet.

6. An apparatus, comprising:
a receiving unit of a network device of a multi-stage CLOS topology structure, configured to receive an IP packet flow; and
an adjusting unit of the network device of the multi-stage CLOS topology structure, configured to adjust a forwarding path of an IP packet according to a quality of service (QOS) parameter of each interconnection link inside the multi-stage CLOS topology structure, and send the IP packet, where the network device of the multi-stage CLOS topology structure is in the IP network;
wherein the adjusting, by the network device of the multi-stage CLOS topology structure, the forwarding path of the IP packet comprises:
using a CLOS-based dispatch function disp to calculate a forwarding path, p=disp (f, l, c, s, p0), where p indicates a forwarding path to be calculated for forwarding an IP packet flow f, f indicates the IP packet flow, l indicates a load of each interconnection link inside the multi-stage CLOS topology structure, c indicates a cost of each interconnection link inside the multi-stage CLOS topology structure, s indicates the QOS parameter of each interconnection link inside the multi-stage CLOS topology structure, and p0 indicates a current forwarding path of the IP packet flow f.

7. The apparatus according to claim 6, wherein the IP packet flow is defined by a 5-tuple, the 5-tuple comprises: a source IP address, a destination IP address, a source media access control (MAC) address, a destination MAC address, and a port number.

8. The apparatus according to claim 6, wherein
the cost of each interconnection link comprises a link distance; and
the QOS parameter of each interconnection link comprises one or more of: a delay, a jitter, a bandwidth and a packet loss rate.

9. The apparatus according to claim 6, wherein the IP network comprises a native IP network, a multi-protocol label switching (MPLS) network, or an Ethernet.

10. The apparatus according to claim 6, wherein when the IP network is a multi-protocol label switching (MPLS) network, the apparatus further comprises:
a setting unit, configured to configure a label switched path (LSP) path corresponding to each interconnection link of the IP network.

11. The apparatus according to claim 6, wherein the forwarding path of the IP network load is adaptively adjusted according to the dynamic load status of the IP network, so as to achieve dynamic load balancing of the IP network.

12. A non-transitory hardware-readable storage medium storing a program that, when executed by a network device of a multi-stage CLOS topology structure, cause the network device of the multi-stage CLOS topology structure to perform operations comprising:
receiving an IP packet flow; and
adjusting a forwarding path of an IP packet according to a quality of service (QOS) parameter of each interconnection link inside the multi-stage CLOS topology structure, and sending the IP packet, where the network device of the multi-stage CLOS topology structure is in the IP network;
where the adjusting the forwarding path of the IP packet comprises:
using a CLOS-based dispatch function disp to calculate a forwarding path, p=disp (f, l, c, s, p0), where p indicates a forwarding path to be calculated for forwarding an IP packet flow f, f indicates the IP packet flow, l indicates a load of each interconnection link inside the multi-stage CLOS topology structure, c indicates a cost of each interconnection link inside the multi-stage CLOS topology structure, s indicates the QOS parameter of each interconnection link inside the multi-stage CLOS topology structure, and p0 indicates a current forwarding path of the IP packet flow f.

13. The non-transitory hardware-readable storage medium of claim 12, where the cost of each interconnection link comprises a link distance; and
the QOS parameter of each interconnection link comprises one or more of: a delay, a jitter, a bandwidth and a packet loss rate.

14. The non-transitory hardware-readable storage medium of claim 12, where the IP network comprises one of: a native IP network, a multi-protocol label switching (MPLS) network, and an Ethernet.

15. The non-transitory hardware-readable storage medium of claim 12, where when the IP network is a multi-protocol label switching (MPLS) network, the operations further comprises:
   configuring a label switched path (LSP) path corresponding to each interconnection link of the IP network.

* * * * *